United States Patent [19]

Ferrarelli

[11] 4,145,788

[45] Mar. 27, 1979

[54] ICE SHIELD

[76] Inventor: John Ferrarelli, 55 Donley St., Morgantown, W. Va. 26505

[21] Appl. No.: 891,724

[22] Filed: Mar. 30, 1978

[51] Int. Cl.² ............................ B60S 1/02; A42L 1/16
[52] U.S. Cl. ................................ 15/250.05; 15/250.16; 98/2.1; 237/12.3 B
[58] Field of Search ............... 15/250.05–250.09, 15/250.16; 239/284, 130; 98/2.1; 237/12.3 B; 296/84 R

[56] References Cited

U.S. PATENT DOCUMENTS

| 2,947,020 | 8/1960 | Wilfert et al. | 15/250.16 |
| 3,738,252 | 6/1973 | Cardinale | 15/250.05 |

*Primary Examiner*—Peter Feldman
*Attorney, Agent, or Firm*—William J. Ruano

[57] ABSTRACT

A heating core for conducting hot water from the motor of an automobile in close proximity to a windshield and windshield wiper blades so as to heat both continuously so as to prevent accumulation of ice on the windshield wiper blades and minimize accumulation on the windshield. A by-pass valve assembly is provided on the return line from the commonly used heating core and fan housing so as not to deprive the driver and passengers of normal heat developed in such core. The windshield heating core is housed in the housing or receptacle immediately below the windshield in which the wiper blades are normally located.

2 Claims, 4 Drawing Figures

ICE SHIELD

This invention relates to a heating means for continuously heating the windshield and windshield wiper blades of an automobile or other motor powered conveyance in which the motor is cooled by water, such as trucks, vans, boats, etc.

Attempts have been made in the past to heat windshield wiper blades electrically by means of heater wires extending through openings in the wiper blades and the like, however, these have not found acceptance in the automotive trade since they involve electrical connections that generally break, also since attempts to heat the wiper blades by turning on a heating switch, when such heating is desired, consumes a considerable amount of heating time, as well as a considerable amount of electrical energy that tends to drain the automobile battery. This is particularly so since the wiper blades, even when substantially heated, are called upon to remove ice from the windshield.

An object of my invention is to provide a novel windshield and windshield wiper blade heating assembly which will overcome all of the above-named disadvantages of electrically heated means proposed in the past.

A more specific object of my invention is to provide a windshield and its wiper blades with a means for continusouly heating both while the blades are in the off position in the receptacle or housing immediately below the windshield and for effecting such heating by hot water from the automobile motor, thereby keeping the windshield free of snow, ice or fog and making the blade ready at all times to wipe any remnant snow, ice or fog from the windshield.

Other objects and advantages will become more apparent from a study of the following description taken with the accompanying drawing wherein.

Figure 1:
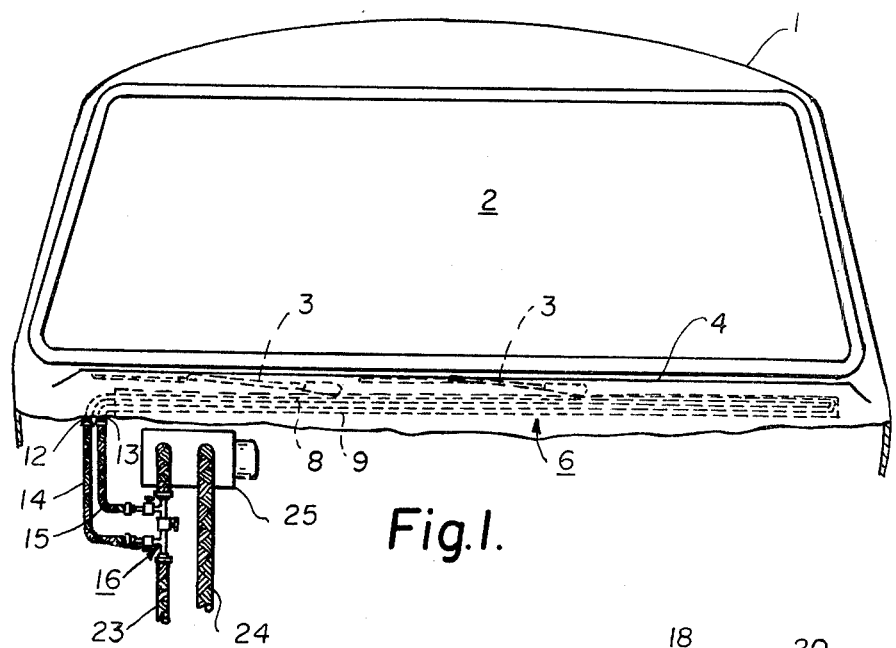
FIG. 1 is a front, elevational view of an automobile windshield and the top of the body portion, and which embodies the present invention.
Figure 2:
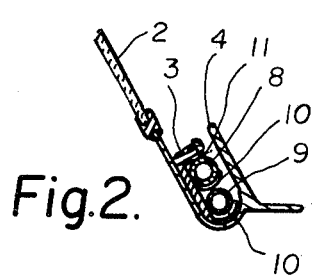
FIG. 2 is an enlarged vertical, cross-sectional view of the windshield wiper and core receptacle or housing located immediately below the windshield.

Referring more particularly to the drawing, numeral 1 denotes an automobile or other conveyance, such as a truck, van, bus, boat, etc., which is driven by a motor cooled by water. Numeral 2 denotes a windshield therefor. At the base of the windshield there is provided the usual housing or receptacle 4 for receiving and partially concealing the windshield wiper blades 3—3 of rubber or other flexible material.

Figure 3:
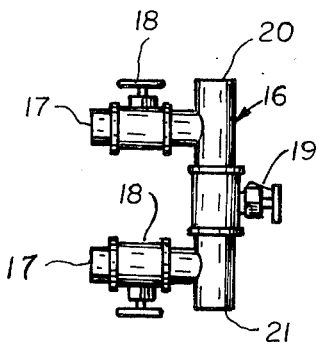
FIG. 3 is an enlarged plan view of the by-pass manifold shown in FIG. 1.
Figure 4:
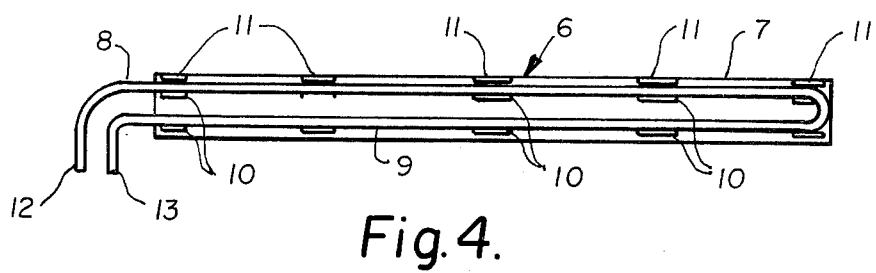
FIG. 4 is a side view of the windshield and wiper heating assembly, with the sidewall of the core housing 4 removed to better illustrate the mounting means.

In accordance with the present invention, there is provided a windshield and wiper blade heating core assembly, generally denoted by numeral 6 and comprising substantially straight core leg portions 8 and 9 which are in substantially parallel, spaced relationship and interconnected at their ends by an integral (or separate) looped portion. Such windshield wiper heater core is preferably of metal tubing of copper, aluminum, steel or the like. The upper and lower legs 8 and 9 of the core are seated on wiper rests 10, and the windshield wiper blades are seated on wiper rests 11. To the downturned extensions 12 and 13 of cores 8 and 9 respectively, flexible hoses 14 and 15 are connected which are, in turn, connected to the outlets and inlets 17,17 of the by-pass manifold 19, shown more clearly in FIG. 3.

To prevent deprivation of normal heat provided by the regular auto heating core housing 25 which encloses the fan for flowing hot air to the windshield, the by-pass manifold 16 is connected to the return hose 23, instead of the inlet hose 24, both of which are connected to the water-cooled motor of the automobile (not shown).

In operation, when it is desired to turn the windshield and wiper blade heating means on for winter use or perhapes also spring or fall use, shut-off valve 19 is closed and shut-off valves 18,18 are opened, whereby water from the motor of the automobile will flow through inlet hose 24, the standard fan and heating core housing 25 and, instead of flowing directly back to the motor through hose 23, it will be by-passed so as to flow upwardly through hose 15, legs 9 and 8 of the core for heating the windshield and wipers, thence to hose 14, the lower valve 18, and finally through the return hose 23 back to the automobile motor manifold.

For summer use, both shut-off valves 18,18 are closed and the shut-off valve 19 is opened, whereby no hot water from the motor will flow through hoses 14 and 15 of the windshield and wiper heater core legs 8 and 9, thereby avoiding unnecessary heating of the windshield and windshield wiper blades.

Valves 18 and 19 may be operated automatically by vacuum means. A fan may be added in the core housing, if desired.

Thus it will be seen that I have provided a highly efficient means for continuously heating the windshield and windshield wiper blades of an automobile or the like so as to radiate a constant flow of heat to the exterior surface of the windshield, as well as to heat the closely adjacent windshield wiper blades so as to keep the windshield free of fog, ice and snow, while at the same time heating and keeping the windshield wipers free of snow and ice and thereby considerably improving driving conditions; also I have provided a by-pass manifold and valve assembly which enables selective flow of warm water from the motor during the winter (and perhaps spring and fall) and not during the summer months, which manifold is simple in construction and easy to assemble; furthermore, I have provided a windshield wiper heater core assembly that can be easily and cheaply manufactured and easily and readily installed on existing automobiles to readily enhance driving safety, particularly during snow, ice and fog conditions.

While I have illustrated and described a single specific embodiment of my invention, it will be understood that this is by way of illustration only and that various changes and modifications may be contemplated in my invention and within the scope of the following claims.

I claim:

1. For use in combination with a windshield of an automotive vehicle powered by a motor which is water-cooled, a housing depending from the base of said windshield, windshield wiper blade means located in said housing, a metal tube through which cooling water of said motor flows and mounted in said housing immediately below said windshield wiper blade means so as to radiate heat towards the outside of said windshield and to heat said windshield wiper blade means simultaneously so as to prevent accumulation on the windshield, a pair of flexible hoses, each having one end connected to one of the terminals of said metal tube, a by-pass manifold including a pair of valves, each connected to one of the other ends of said flexible hoses, a heating core housing, said pair of valves being connected to a return conduit of said heating core housing which leads to said water-co led motor, a shut-off valve in said manifold between said pair of valves for shutting off flow of heated water in said return conduit and by-passing the flow through said pair of flexible hoses, said pair of valves and said metal tube, for winter operation, the closing of said pair of valves and opening of said shut-off valve disconnecting said metal tube from said return conduit, when not needed, as in summer.

2. Apparatus as recited in claim 1 wherein said metal tube is doubled back upon itself throughout the width of said windshield so that said pair of flexible hoses are connected to said metal tube at only one end of said windshield, and a plurality of seating elements spaced longitudinally of said metal tube for maintaining the doubled back portions of the metal tube in fixed, spaced, parallel relationship.

* * * * *